(12) United States Patent
Yi et al.

(10) Patent No.: US 10,448,273 B2
(45) Date of Patent: Oct. 15, 2019

(54) METHOD FOR TRANSMITTING A QUEUING DELAY MEASUREMENT REPORT IN A WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/765,714

(22) PCT Filed: Aug. 24, 2016

(86) PCT No.: PCT/KR2016/009370
§ 371 (c)(1),
(2) Date: Apr. 3, 2018

(87) PCT Pub. No.: WO2017/061695
PCT Pub. Date: Apr. 13, 2017

(65) Prior Publication Data
US 2018/0302816 A1 Oct. 18, 2018

Related U.S. Application Data

(60) Provisional application No. 62/237,504, filed on Oct. 5, 2015.

(51) Int. Cl.
*H04W 24/10* (2009.01)
*H04W 24/08* (2009.01)
(Continued)

(52) U.S. Cl.
CPC ............. *H04W 24/10* (2013.01); *H04L 47/32* (2013.01); *H04W 24/08* (2013.01);
(Continued)

(58) Field of Classification Search
None
See application file for complete search history.

(56) References Cited

U.S. PATENT DOCUMENTS

2009/0116399 A1    5/2009  Ho et al.
2010/0034187 A1*   2/2010  Kumar ................... H04L 47/14
                                                            370/345
(Continued)

FOREIGN PATENT DOCUMENTS

WO     2009/045945     4/2009

OTHER PUBLICATIONS

PCT International Application No. PCT/KR2016/009370, International Search Report dated Nov. 28, 2016, 8 pages.
(Continued)

*Primary Examiner* — Diane L Lo
(74) *Attorney, Agent, or Firm* — Lee Hong Degerman Kang & Waimey

(57) ABSTRACT

The present invention relates to a method and a device for transmitting a queuing delay measurement report in a wireless communication system, the method comprising: receiving a queuing delay measurement configuration including discard timer values and a measurement period from an eNB, wherein each of the discard timer values respectively corresponds to one radio bearer among a set of radio bearers associated with a QCI configured for the UE, determining a queuing delay for the QCI based on queuing delays for PDCP SDUs from the set of radio bearers during the measurement period, selecting a specific discard timer value among the discard timer values, calculating a queuing delay ratio for the QCI by dividing the queuing delay for the QCI by the specific discard timer value, and transmitting a queuing delay measurement report including the QCI and the queuing delay ratio for the QCI to the eNB.

16 Claims, 10 Drawing Sheets

(51) Int. Cl.
*H04W 28/02* (2009.01)
*H04L 12/823* (2013.01)

(52) U.S. Cl.
CPC ... *H04W 28/0205* (2013.01); *H04W 28/0236* (2013.01); *H04W 28/0263* (2013.01); *H04W 28/0268* (2013.01)

(56) References Cited

U.S. PATENT DOCUMENTS

| 2015/0078339 | A1  | 3/2015 | Ohta et al. |
| 2017/0034025 | A1* | 2/2017 | Kollar ................ H04L 43/0852 |
| 2018/0084451 | A1* | 3/2018 | Fukuta ................ H04W 24/10 |

OTHER PUBLICATIONS

Nokia, "Queuing delay measurement", 3GPP TSG RAN WG2 Meeting #91bis, R2-154105, Oct. 2015, 4 pages.
Kyocera, "Configuration and report mechanism for UL PDCP queuing delay", 3GPP TSG RAN WG2 Meeting #91bis, R2-154685, Oct. 2015, 3 pages.
3rd Generation Partnership Project (3GPP), "Technical Specification Group Radio Access Network; Evolved Universal Terrestrial Radio Access (E-UTRA); Layer 2—Measurements (Release 12)," 3GPP TS 36.314 V12.0.0, Sep. 2014, 20 pages.
European patent application No. 16853811.4, European search report dated May 20, 2019, 13 pages.
Ericsson, "Packet delay and drop rate for MDT QoS measurements," 3GPP TSG-RAN WG2 #90, XP050973400, Tdoc R2-152521, Fukuoka, Japan, May 25-29, 2015, 8 pages.
Huawei et al., "Enhanced QoS Verification in feMDT," 3GPP TSG-RAN WG2 Meeting #91bis, XP051005323, R2-154863, Malmo, Sweden, Oct. 5-9, 2015, 4 pagess.
LG Electronics Inc., "Issues on reporting MDT measurement results per QCI," 3GPP TSG-RAN WG2 Meeting #91bis, KP051040294, R2-154455, Malmo, Sweden, Oct. 5-9, 2015, 2 pages.

\* cited by examiner

FIG. 5
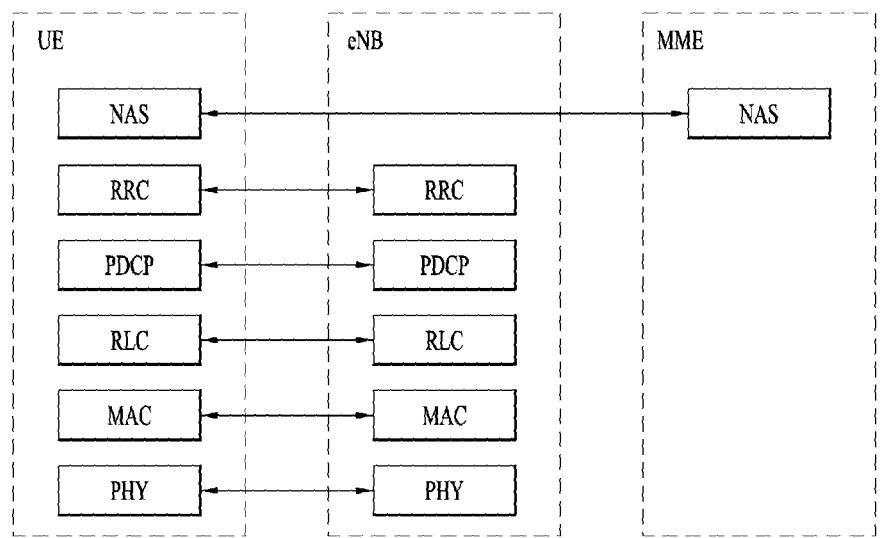
(a) Control-Plane Protocol Stack
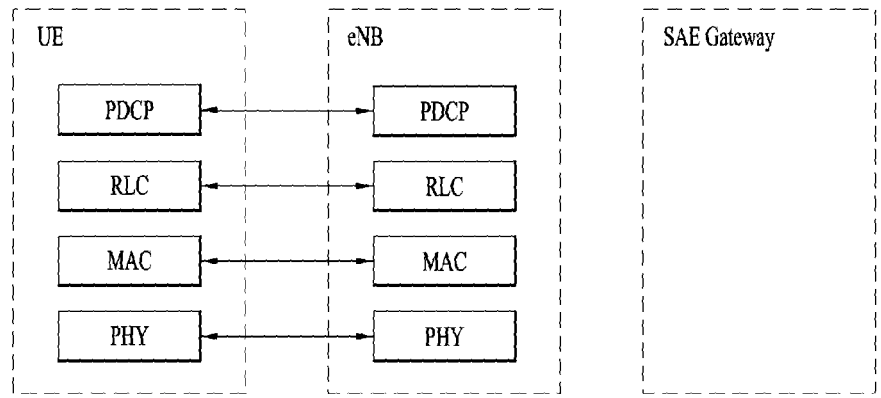
(b) User-Plane Protocol Stack

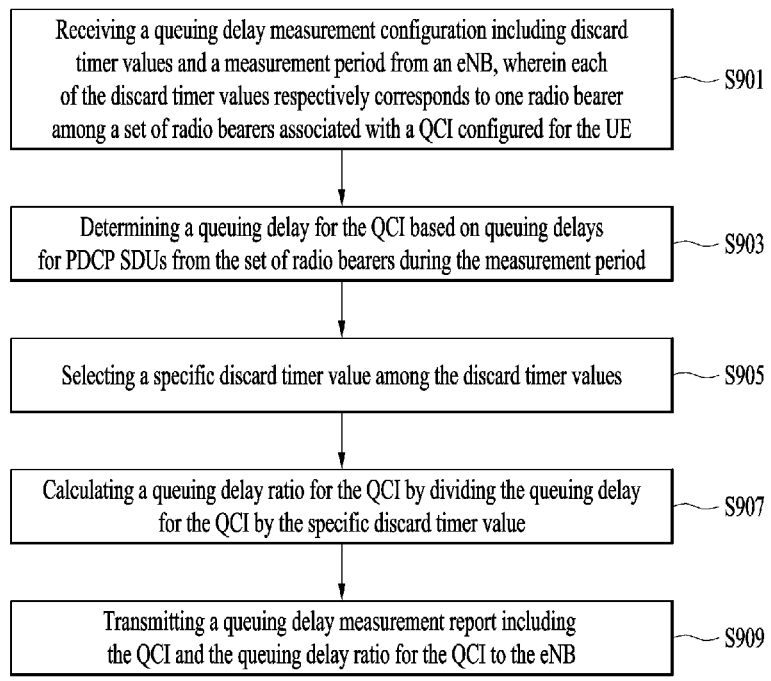

METHOD FOR TRANSMITTING A QUEUING DELAY MEASUREMENT REPORT IN A WIRELESS COMMUNICATION SYSTEM AND A DEVICE THEREFOR

CROSS-REFERENCE TO RELATED APPLICATIONS

This application is a National Stage filing under 35 U.S.C. 371 of International Application No. PCT/KR2016/009370, filed on Aug. 24, 2016, which claims the benefit of U.S. Provisional Application No. 62/237,504, filed on Oct. 5, 2015, the contents of which are all hereby incorporated by reference herein their entirety.

TECHNICAL FIELD

The present invention relates to a wireless communication system and, more particularly, to a method for transmitting a queuing delay measurement report in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for transmitting a queuing delay measurement report in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In order to minimize signaling overhead regarding an UL PDCP queuing delay measurement report, it is invented that a UE reports an average UL PDCP queuing delay as a ratio of a PDCP SDU discard timer value.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is a diagram showing a control plane and a user plane of a radio interface protocol between a UE and an E-UTRAN based on a 3rd generation partnership project (3GPP) radio access network standard;

FIG. 9 is conceptual diagram for a UE operation for reporting a queuing delay measurement for a QCI according to an exemplary embodiment of the present invention;

FIG. 10 shows an example of reporting a queuing delay measurement for a QCI according to an exemplary embodiment of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
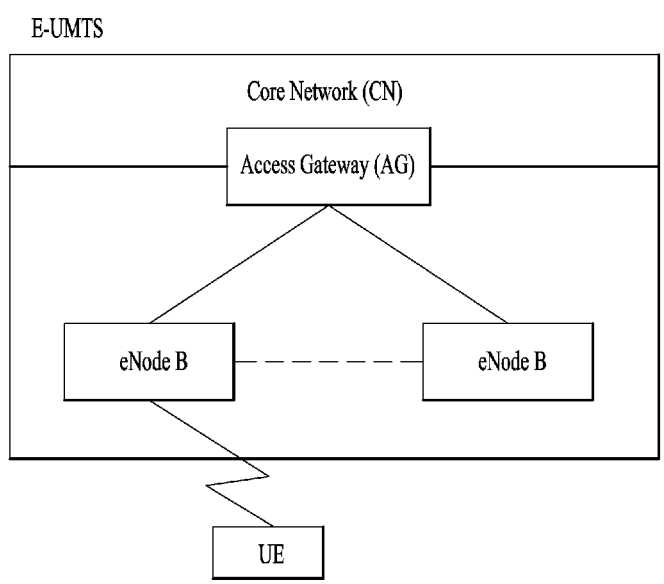
FIG. 1 is a diagram showing a network structure of an Evolved Universal Mobile Telecommunications System (E-UMTS) as an example of a wireless communication system.
Figure 2A:
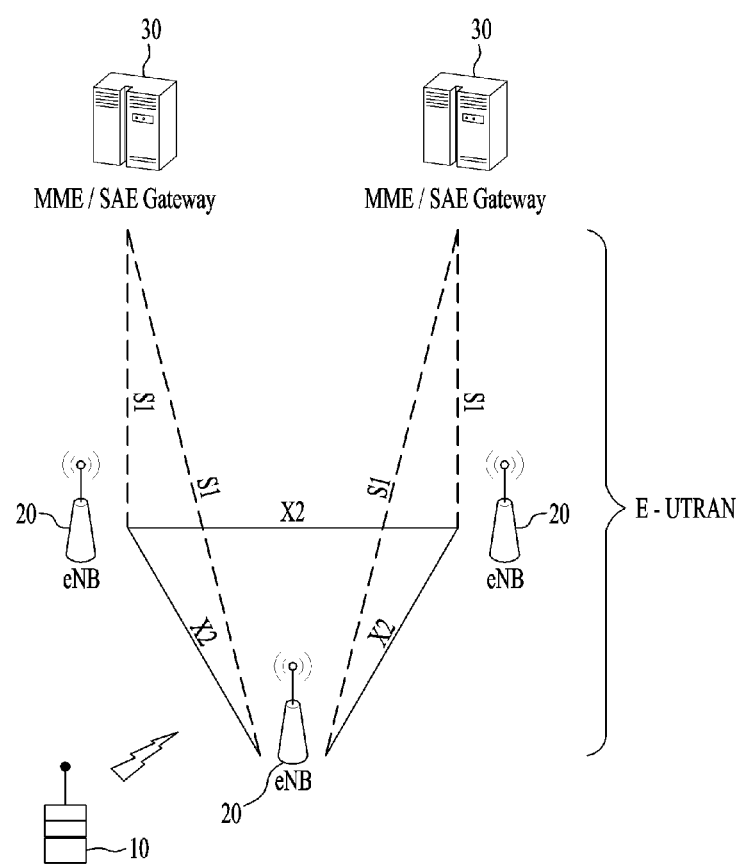
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
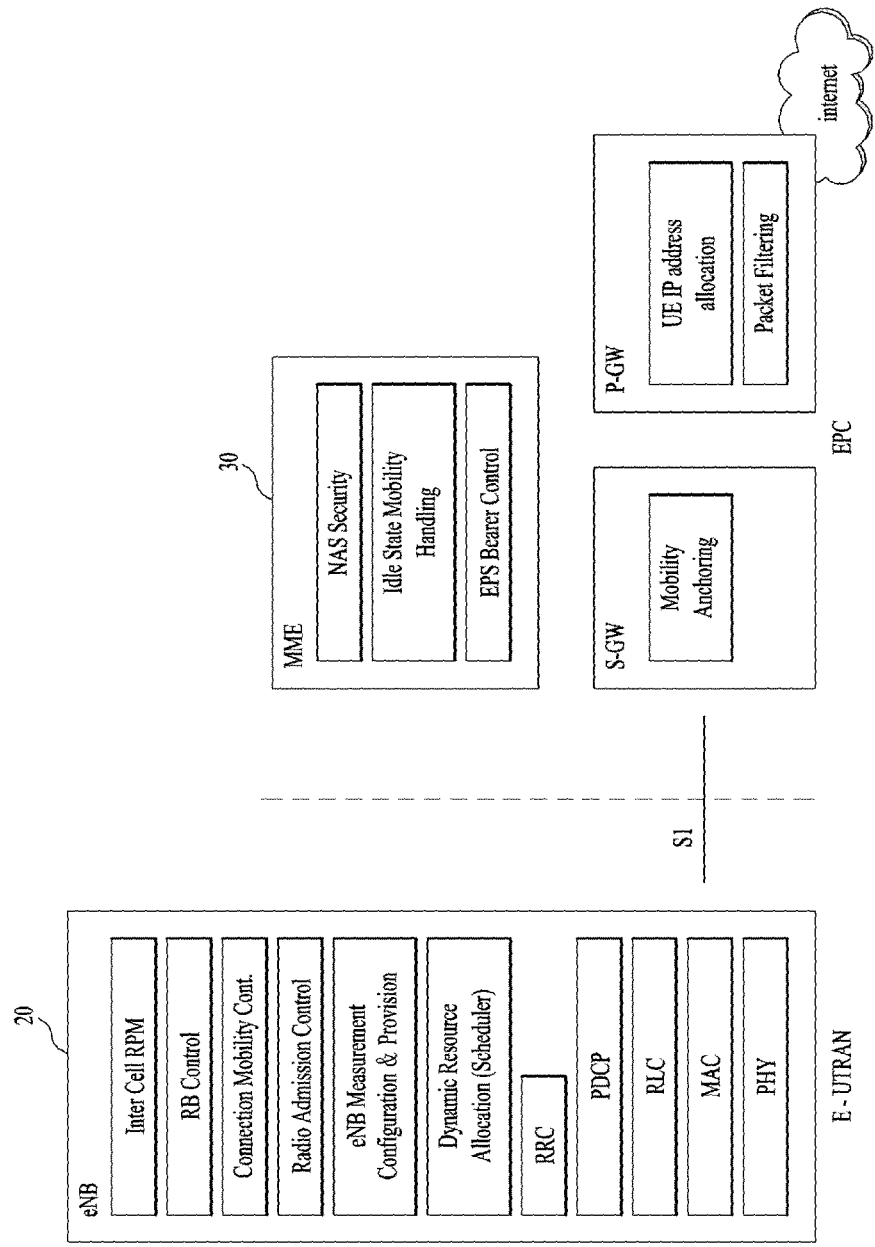
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
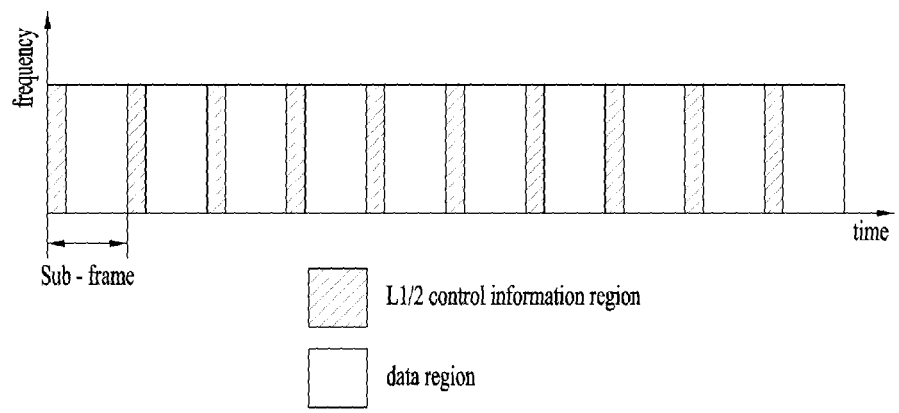
FIG. 3 is a view showing an example of a physical channel structure used in an E-UMTS system.

FIG. 3 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 3, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 4:
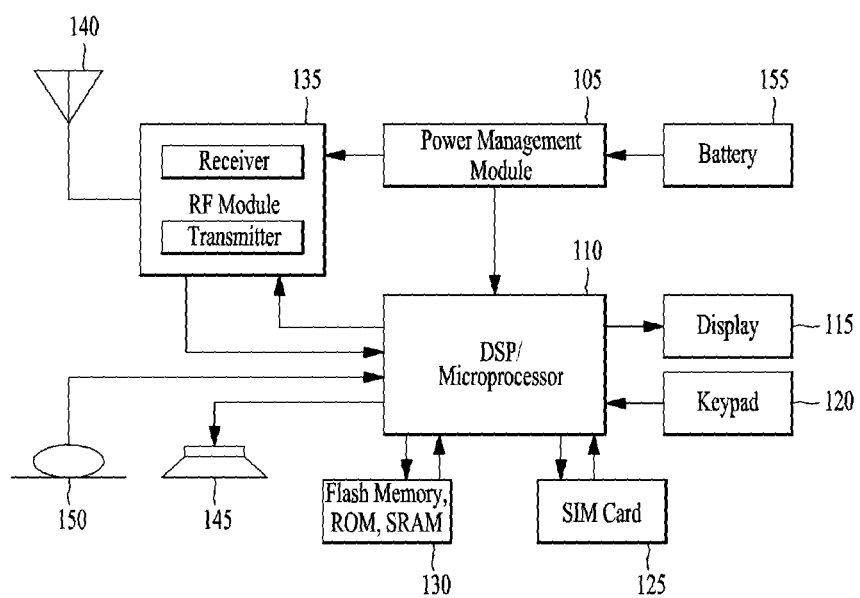
FIG. 4 is a block diagram of a communication apparatus according to an embodiment of the present invention.

FIG. 4 is a block diagram of a communication apparatus according to an embodiment of the present invention.

The apparatus shown in FIG. 4 can be a user equipment (UE) and/or eNB adapted to perform the above mechanism, but it can be any apparatus for performing the same operation.

As shown in FIG. 4, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 4 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 4 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 5 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

TABLE 1

RadioResourceConfigDedicated information element

```
-- ASN1START
RadioResourceConfigDedicated ::=    SEQUENCE {
    srb-ToAddModList                SRB-ToAddModList        OPTIONAL,    --
    Cond HO-Conn
```

TABLE 1-continued

| RadioResourceConfigDedicated information element | | | |
|---|---|---|---|
| drb-ToAddModList | DRB-ToAddModList | OPTIONAL, | -- Cond HO-toEUTRA |
| drb-ToReleaseList | DRB-ToReleaseList | OPTIONAL, | -- Need ON |
| mac-MainConfig | CHOICE { | | |
| explicitValue | MAC-MainConfig, | | |
| defaultValue | NULL | | |
| } OPTIONAL, | | | -- Cond HO-toEUTRA2 |
| sps-Config | SPS-Config | OPTIONAL, | -- Need ON |
| physicalConfigDedicated | PhysicalConfigDedicated | OPTIONAL, | -- Need ON |
| ..., | | | |
| [[ rlf-TimersAndConstants-r9 | RLF-TimersAndConstants-r9 | OPTIONAL | -- Need ON |
| ]], | | | |
| [[ measSubframePatternPCell-r10 | MeasSubframePatternPCell-r10 | OPTIONAL | -- Need ON |
| ]], | | | |
| [[ neighCellsCRS-Info-r11 | NeighCellsCRS-Info-r11 | OPTIONAL | -- Need ON |
| ]], | | | |
| [[ naics-Info-r12 | NAICS-AssistanceInfo-r12 | OPTIONAL | -- Need ON |
| ]]} | | | |
| RadioResourceConfigDedicatedPSCell-r12 ::= SEQUENCE { | | | |
| -- UE specific configuration extensions applicable for an PSCell | | | |
| physicalConfigDedicatedPSCell-r12 | PhysicalConfigDedicated | OPTIONAL, | -- Need ON |
| sps-Config-r12 | SPS-Config | OPTIONAL, | -- Need ON |
| naics-Info-r12 | NAICS-AssistanceInfo-r12 | OPTIONAL, | -- Need ON |
| ... | | | |
| } | | | |
| RadioResourceConfigDedicatedSCG-r12 ::= SEQUENCE { | | | |
| drb-ToAddModListSCG-r12 | DRB-ToAddModListSCG-r12 | OPTIONAL, | -- Need ON |
| mac-MainConfigSCG-r12 | MAC-MainConfig | OPTIONAL, | -- Need ON |
| rlf-TimersAndConstantsSCG-r12 | RLF-TimersAndConstantsSCG-r12 | OPTIONAL, | -- Need ON |
| ... | | | |
| } | | | |
| RadioResourceConfigDedicatedSCell-r10 ::= SEQUENCE { | | | |
| -- UE specific configuration extensions applicable for an SCell | | | |
| physicalConfigDedicatedSCell-r10 | PhysicalConfigDedicatedSCell-r10 | OPTIONAL, | -- Need ON |
| ..., | | | |
| [[ mac-MainConfigSCell-r11 | MAC-MainConfigSCell-r11 | OPTIONAL | -- Cond SCellAdd |
| ]], | | | |
| [[ naics-Info-r12 | NAICS-AssistanceInfo-r12 | OPTIONAL | -- Need ON |
| ]] | | | |
| } | | | |
| SRB-ToAddModList ::= | SEQUENCE (SIZE (1 . . 2)) OF SRB-ToAddMod | | |
| SRB-ToAddMod ::= SEQUENCE { | | | |
| srb-Identity | INTEGER (1 . . 2), | | |
| rlc-Config | CHOICE { | | |
| explicitValue | RLC-Config, | | |
| defaultValue | NULL | | |
| } OPTIONAL, | | | -- Cond Setup |
| logicalChannelConfig | CHOICE { | | |
| explicitValue | LogicalChannelConfig, | | |
| defaultValue | NULL | | |
| } OPTIONAL, | | | -- Cond Setup |
| ... | | | |
| } | | | |
| DRB-ToAddModList ::= | SEQUENCE (SIZE (1 . . maxDRB)) OF DRB-ToAddMod | | |
| DRB-ToAddModListSCG-r12 ::= | SEQUENCE (SIZE (1 . . maxDRB)) OF DRB-ToAddModSCG-r12 | | |
| DRB-ToAddMod ::= SEQUENCE { | | | |
| eps-BearerIdentity | INTEGER (0 . . 15) | OPTIONAL, | -- Cond DRB-Setup |
| drb-Identity | DRB-Identity, | | |
| pdcp-Config | PDCP-Config | OPTIONAL, | -- Cond PDCP |
| rlc-Config | RLC-Config | OPTIONAL, | -- Cond SetupM |

TABLE 1-continued

RadioResourceConfigDedicated information element

```
    logicalChannelIdentity          INTEGER (3 . . 10)              OPTIONAL,       -- Cond DRB-
SetupM
    logicalChannelConfig            LogicalChannelConfig            OPTIONAL,       -- Cond
SetupM
    . . . ,
    [[ drb-TypeChange-r12           ENUMERATED {toMCG}              OPTIONAL,       -- Need
OP
        rlc-Config-v1250            RLC-Config-v1250                OPTIONAL        -- Need
ON
    ]]
}
DRB-ToAddModSCG-r12 ::=     SEQUENCE {
    drb-Identity-r12                DRB-Identity,
    drb-Type-r12                    CHOICE {
        split-r12                   NULL,
        scg-r12                     SEQUENCE {
            eps-BearerIdentity-r12      INTEGER (0 . . 15)          OPTIONAL,       -- Cond DRB-
Setup
            pdcp-Config-r12             PDCP-Config                 OPTIONAL        -- Cond PDCP-S
        }
    }                                                               OPTIONAL, -- Cond SetupS2
    rlc-ConfigSCG-r12               RLC-Config                      OPTIONAL, -- Cond SetupS
    rlc-Config-v1250                RLC-Config-v1250                OPTIONAL,       -- Need
ON
    logicalChannelIdentitySCG-r12   INTEGER (3 . . 10)              OPTIONAL,       -- Cond DRB-
SetupS
    logicalChannelConfigSCG-r12     LogicalChannelConfig            OPTIONAL,       -- Cond
SetupS
    . . .
}
DRB-ToReleaseList ::=           SEQUENCE (SIZE (1 . . maxDRB)) OF DRB-Identity
MeasSubframePatternPCell-r10 ::=        CHOICE {
    release                         NULL,
    setup                           MeasSubframePattern-r10
}
NeighCellsCRS-Info-r11 ::=          CHOICE {
    release                         NULL,
    setup                           CRS-AssistanceInfoList-r11
}
CRS-AssistanceInfoList-r11 ::=   SEQUENCE (SIZE (1 . . maxCellReport)) OF CRS-
AssistanceInfo-r11
CRS-AssistanceInfo-r11 ::=      SEQUENCE {
    physCellId-r11                  PhysCellId,
    antennaPortsCount-r11           ENUMERATED (an1, an2, an4, spare1),
    mbsfn-SubframeConfigList-r11    MBSFN-SubframeConfigList,
    . . .
}
NAICS-AssistanceInfo-r12 ::=        CHOICE {
    release                         NULL,
    setup                           SEQUENCE {
        neighCellsToReleaseList-r12         NeighCellsToReleaseList-r12
OPTIONAL , -- Need ON
        neighCellsToAddModList-r12          NeighCellsToAddModList-r12                  OPTIONAL,
        -- Need ON
        servCellp-a-r12             P-a                             OPTIONAL -- Need ON
    }
}
NeighCellsToReleaseList-r12     ::= SEQUENCE (SIZE (1 . . maxNeighCell-r12)) OF
PhysCellId
NeighCellsToAddModList-r12 ::=  SEQUENCE (SIZE (1 . . maxNeighCell-r12)) OF
NeighCellsInfo-r12
NeighCellsInfo-r12          ::=         SEQUENCE {
    physCellId-r12                  PhysCellId,
    p-b-r12                         INTEGER (0..3),
    crs-PortsCount-r12              ENUMERATED {n1, n2, n4, spare},
    mbsfn-SubframeConfig-r12        MBSFN-SubframeConfigList                        OPTIONAL, --
Need ON
    p-aList-r12                     SEQUENCE (SIZE (1 . . maxP-a-PerNeighCell-r12)) OF P-a,
    transmissionModeList-r12        BIT STRING (SIZE(8)),
    resAllocGranularity-r12         INTEGER (1 . . 4),
    . . .
}
P-a ::= ENUMERATED { dB-6, dB-4dot77, dB-3, dB-1d0t77,
                    dB0, dB1, dB2, dB3}
-- ASN1STOP
```

Table 1 shows RadioResourceConfigDedicated information element (IE) included in RRCConnectionReconfiguration message. The RadioResourceConfigDedicated IE in Table 1 is used to setup/modify/release RBs, to modify the MAC main configuration, to modify the SPS configuration and to modify dedicated physical configuration. As shown in Table 1, the RadioResourceConfigDedicated IE includes PDCP-Config field. The PDCP-Config field is mandatory present if the corresponding DRB is being setup. The PDCP-Config field is optionally present, need ON, upon reconfiguration of the corresponding split DRB, upon the corresponding DRB type change from split to MCG bearer, upon the corresponding DRB type change from MCG to split bearer, upon handover within E-UTRA and upon the first reconfiguration after re-establishment but in all these cases only when fullConfig is not included in the RRCConnectionReconfiguration message. Otherwise, it is not present.

Table 2 shows PDCP-Config IE included in the RadioResourceConfigDedicated IE. The PDCP-Config IE in Table 2 is used to set the configurable PDCP parameters for data radio bearers. Each field in Table 2 is specified in TS 36.331 version 12.5.0. For example, discardTimer field indicates a discard timer value specified in TS 36.323 version 12.4.0. The discard timer value is in milliseconds. In the discardTimer field, ms50 means 50 ms, ms100 means 100 ms and so on.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a

TABLE 2

PDCP-Config information element

```
-- ASN1START
PDCP-Config ::=           SEQUENCE {
  discardTimer                          ENUMERATED {
                                        ms50, ms100, ms150, ms300, ms500,
                                        ms750, ms1500, infinity
  }                                     OPTIONAL,         -- Cond Setup
  rlc-AM                                SEQUENCE {
    statusReportRequired                  BOOLEAN
  }                                     OPTIONAL,         -- Cond Rlc-AM
  rlc-UM                                SEQUENCE {
    pdcp-SN-Size                          ENUMERATED {len7bits, len12bits}
  }                                     OPTIONAL,         -- Cond Rlc-UM
  headerCompression                     CHOICE {
    notUsed                               NULL,
    rohc                                  SEQUENCE {
      maxCID                                INTEGER (1 .. 16383)   DEFAULT 15,
      profiles                              SEQUENCE {
                      profile0x0001           BOOLEAN,
                      profile0x0002           BOOLEAN,
                      profile0x0003           BOOLEAN,
                      profile0x0004           BOOLEAN,
                      profile0x0006           BOOLEAN,
                      profile0x0101           BOOLEAN,
                      profile0x0102           BOOLEAN,
                      profile0x0103           BOOLEAN,
                      profile0x0104           BOOLEAN
      },
      ...
    }
  },
  ...,
  [[ rn-IntegrityProtection-r10         ENUMERATED        {enabled}
  OPTIONAL    -- Cond RN
  ]],
  [[ pdcp-SN-Size-v1130                 ENUMERATED        {len15bits}
  OPTIONAL    -- Cond Rlc-AM2
  ]],
  [[ ul-DataSplitDRB-ViaSCG-r12         BOOLEAN
  OPTIONAL,   -- Need ON
    t-Reordering-r12                    ENUMERATED {
                                        ms0, ms20, ms40, ms60, ms80,
                                        ms100, ms120, ms140,
                                        ms160, ms180, ms200, ms220,
                                        ms240, ms260, ms280, ms300,
                                        ms500, ms750, spare14,
                                        spare13, spare12, spare11,
                                        spare10, spare9, spare8,
                                        spare7, spare6, spare5,
                                        spare4, spare3,
                                        spare2, spare1}
  OPTIONAL    -- Cond SetupS
  ]]
}
-- ASN1STOP
``` downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 6:
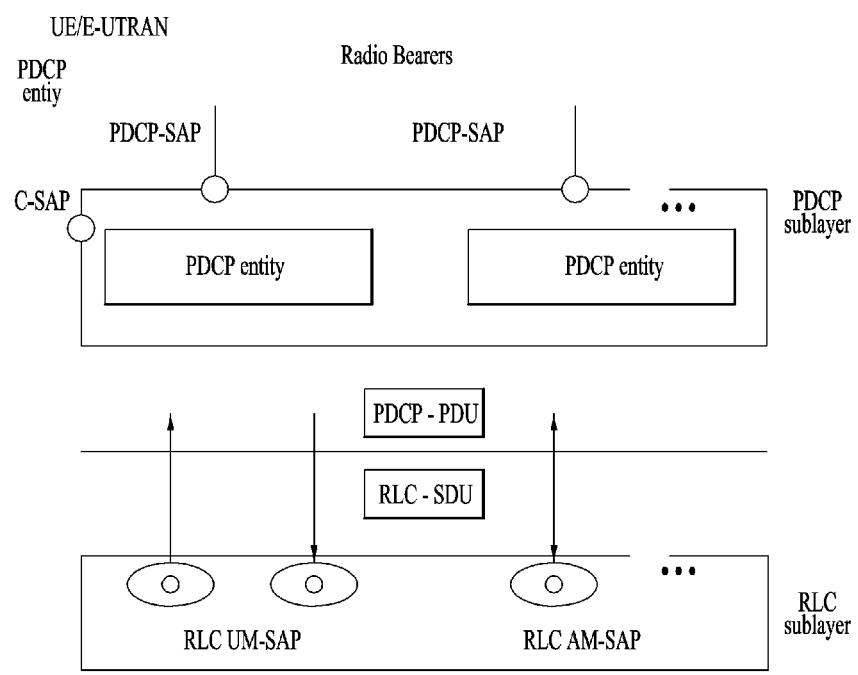
FIG. 6 is a conceptual diagram for a PDCP entity architecture.

FIG. 6 is a conceptual diagram for a PDCP entity architecture.

FIG. 6 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. unidirectional or bi-directional) and RLC mode. The PDCP entities are located in the PDCP sublayer. The PDCP sublayer is configured by upper layers.

Figure 7:
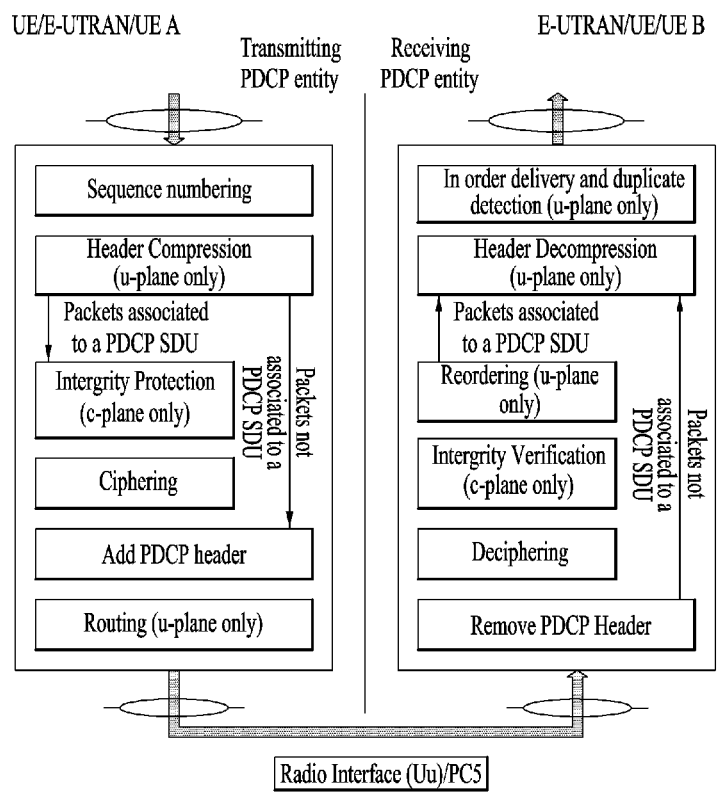
FIG. 7 is a conceptual diagram for functional view of a PDCP entity.

FIG. 7 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 7 represents the functional view of the PDCP entity for the PDCP sublayer; it should not restrict implementation. The figure is based on the radio interface protocol architecture.

At reception of a PDCP service data unit (SDU) from upper layers, the UE may start a discardTimer associated with this PDCP SDU. A transmitting side of each PDCP entity for DRBs may maintain the discardTimer. The duration of the discardTimer is configured by upper layers. In the transmitter, a new timer is started upon reception of a PDCP SDU from an upper layer. For a PDCP SDU received from upper layers, the UE may associate the PDCP sequence number (SN) corresponding to Next_PDCP_TX_SN to the PDCP SDU, perform header compression of the PDCP SDU, perform integrity protection and ciphering using COUNT based on TX_HFN and the PDCP SN associated with this PDCP SDU, increment the Next_PDCP_TX_SN by one, and submit the resulting PDCP Data PDU to lower layer. If the Next_PDCP_TX_SN is greater than Maximum_PDCP_SN, the Next_PDCP_TX_SN is set to '0' and TX_HFN is incremented by one.

When the discard timer expires for a PDCP SDU, or the successful delivery of a PDCP SDU is confirmed by PDCP status report, the UE may discard the PDCP SDU along with the corresponding PDCP PDU. If the corresponding PDCP PDU has already been submitted to lower layers the discard is indicated to lower layers. The transmitting side of each PDCP entity for DRBs may maintain the discard timer. The duration of the timer is configured by upper layers. In the transmitter, a new timer is started upon reception of an SDU from upper layer.

Figure 8A:
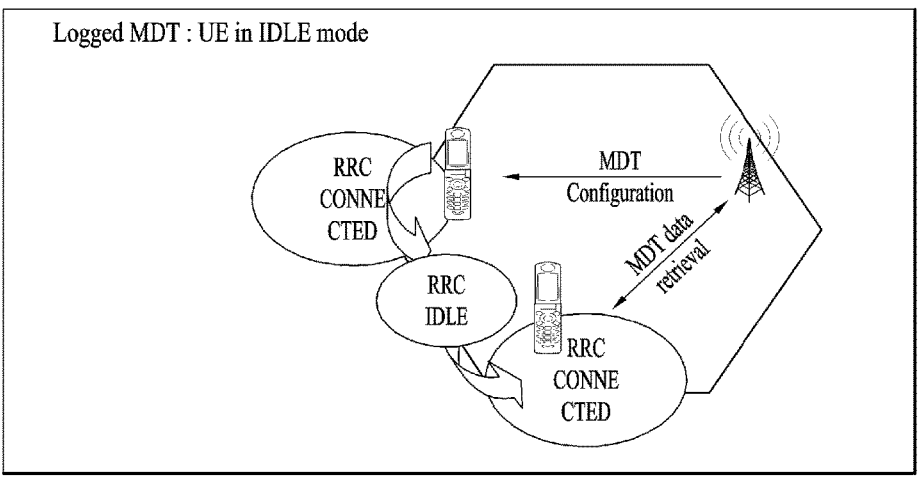
FIG. 8A is a conceptual diagram for Logged MDT.
Figure 8B:
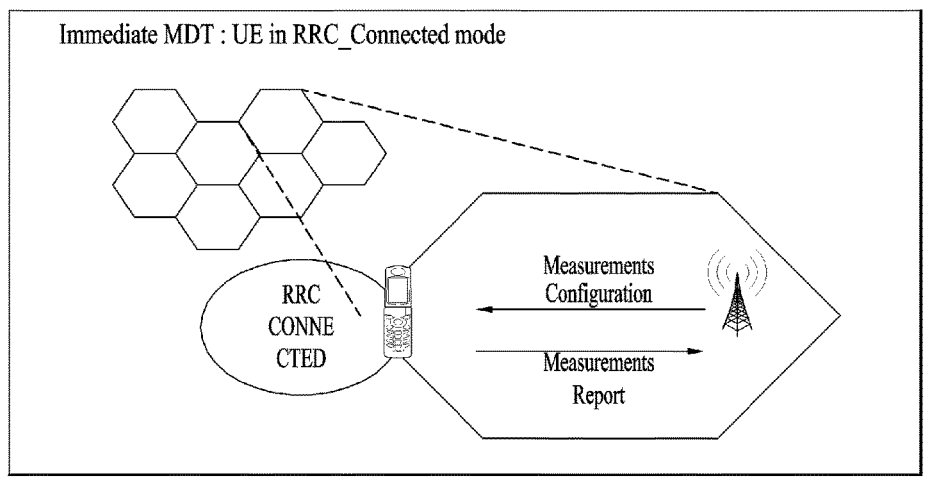
FIG. 8B is a conceptual diagram for Immediate MDT.

FIG. 8A is a conceptual diagram for Logged MDT, and FIG. 8B is a conceptual diagram for Immediate MDT.

In wireless mobile networks quality of user experience changes dynamically and depends on large variety of factors. Because of that mobile operators are willing to timely and effectively evaluate provided Quality of Service (QoS) in their networks. Nowadays the main tool for monitoring network state and performance is drive testing. To replace this expensive and mostly manual procedure, concept of Minimization of Drive Tests (MDT) is being developed in 3GPP LTE standardization.

MDT is about UE measurement collection for off-line processing. No automatic mechanism is defined MDT. The MDT mode includes 2 modes for MDT measurements: Logged MDT and Immediate MDT.

The Immediate MDT is that a MDT functionality involving measurements performed by the UE in CONNECTED state and reporting of the measurements to eNB/radio network controller (RNC) available at the time of reporting condition as well as measurements by the network for MDT purposes. The Logged MDT is a MDT functionality involving measurement logging by UE in IDLE mode, CELL_paging channel (CELL_PCH), UTRAN registration area_PCH (URA_PCH) states and CELL_forward access channel (CELL_FACH) state when second DRX cycle is used (when UE is in UTRA) for reporting to eNB/RNC at a later point in time, and logging of MBSFN measurements by E-UTRA UE in IDLE and CONNECTED modes.

MDT measurements may include packet delay measurement, packet discard rate measurement, and packet loss rate measurement.

Packet Delay in DL per QCI refers to packet delay for DRBs. The objective of this measurement is to measure L2 Packet Delay for operations and maintenance (OAM) performance observability or for QoS verification of MDT. For arrival of packets the reference point is PDCP upper service access point (SAP). For successful reception the reference point is MAC lower SAP. The Detailed Definition and explanations of the Packet Delay in DL per QCI can be found in Equation 1 and Table 1 below.

$$M(T, qci) = \left\lfloor \frac{\sum_{\forall i} tAck(i) - tArriv(i)}{I(T)} \right\rfloor \quad \text{[Equation 1]}$$

TABLE 3

| | |
|---|---|
| M(T, qci) | Packet Delay in the DL per QCI, averaged during time period T. Unit: Integer ms. |
| tArriv(i) | The point in time when PDCP SDU i arrives. |
| tAck(i) | The point in time when the last piece of PDCP SDU i was received by the UE according to received HARQ feedback information. |
| i | A PDCP SDU that arrives at the PDCP upper SAP during time period T. PDCP SDU for which HARQ acknowledgement is not received for all parts shall not be included in the calculation. |
| I(T) | Total number of PDCP SDUs i. |
| T | Time Period during which the measurement is performed |

Packet Discard Rate in DL per QCI refers to discard for DRBs. The objective of this measurement is to measure packets that are dropped due to congestion, traffic management etc, for OAM performance observability. One packet corresponds to one PDCP SDU. The reference point is PDCP upper SAP. The Detailed Definition and explanations of the Packet Discard Rate in DL per QCI can be found in Equation 2 and Table 2 below.

$$M(T, qci) = \left\lfloor \frac{Ddisc(T, qci) * 1000000}{N(T, qci)} \right\rfloor \quad \text{[Equation 2]}$$

TABLE 4

| | |
|---|---|
| M(T, qci) | Packet Discard Rate in the DL per QCI, averaged during time period T. Unit: number of discarded packets per received packets * $10^6$, Integer. |
| Ddisc(T, qci) | Number of DL packets, for which no part has been transmitted over the air, of a data radio bearer with QCI = qci, that are discarded during time period T in the PDCP, RLC or MAC layers due to reasons other than hand-over. |
| N(T, qci) | Number of DL packets of bearer with QCI = qci that has entered PDCP upper SAP during time period T (NOTE). |
| T | Time Period during which the measurement is performed, Unit: minutes (NOTE). |

It is noted that packet loss is expected to be small or very small. The statistical accuracy of an individual discard rate measurement result is dependent on how many packets has been received, and thus the time for the measurement.

Packet Uu Loss Rate in DL per QCI refers to packet loss for DRBs. The objective of this measurement is to measure packets that are lost at Uu transmission, for OAM performance observability. One packet corresponds to one PDCP SDU. The Detailed Definition and explanations of the Packet Uu Loss Rate in DL per QCI can be found in Equation 3 and Table 3 below.

$$M(T, qci) = \left\lfloor \frac{Dloss(T, qci) * 1000000}{N(T, qci) + Dloss(T, qci)} \right\rfloor \quad \text{[Equation 3]}$$

TABLE 5

| | |
|---|---|
| M(T, qci) | Packet Uu Loss Rate in the DL per QCI. Unit: number of lost packets per transmitted packets * $10^6$, Integer. |
| Dloss(T, qci) | Number of DL packets, of a data radio bearer with QCI = qci, for which at least a part has been transmitted over the air but not positively acknowledged, and it was decided during time period T that no more transmission attempts will be done. If transmission of a packet might continue in another cell, it shall not be included in this count. |
| N(T, qci) | Number of DL packets, of a data radio bearer with QCI = qci, which has been transmitted over the air and positively acknowledged during time period T. |
| T | Time Period during which the measurement is performed, Unit: minutes (NOTE). |

It is noted that packet loss is expected to be upper bounded by the Packet Error Loss Rate (PELR) of the QCI which takes values between $10^{-6}$ and $10^{-2}$. The statistical accuracy of an individual packet loss rate measurement result is dependent on how many packets have been received, and thus the time for the measurement.

Packet Loss Rate in UL per QCI refers to packet loss for DRBs. The objective of this measurement is to measure packets that are lost in the UL, for OAM performance observability. One packet corresponds to one PDCP SDU. Reference point is the PDCP upper SAP. The Detailed Definition and explanations of the Packet Loss Rate in UL per QCI can be found in Equation 4 and Table 4 below.

$$M(T, qci) = \left\lfloor \frac{Dloss(T, qci) * 1000000}{N(T, qci)} \right\rfloor \quad \text{[Equation 4]}$$

TABLE 6

| | |
|---|---|
| M(T, qci) | Packet Loss Rate in the UL per QCI. Unit: number of lost packets per transmitted packets * $10^6$, Integer. |
| Dloss(T, qci) | Number of missing UL PDCP sequence numbers, representing packets that are not delivered to higher layers, of a data radio bearer with QCI = qci during time period T. If transmission of a packet might continue in another cell, it shall not be included in this count. |
| N(T, qci) | Total number of UL PDCP sequence numbers (also including missing sequence numbers) of a bearer with QCI = qci, starting from the sequence number of the first packet delivered by PDCP upper SAP to higher layers until the sequence number of the last packet during time period T. |
| T | Time Period during which the measurement is performed, Unit: minutes (NOTE). |

It is noted that packet loss is expected to be upper bounded by the PELR of the QCI which takes values between $10^{-6}$ and $10^{-2}$. The statistical accuracy of an individual packet loss rate measurement result is dependent on how many packets have been received, and thus the time for the measurement.

Measurements in MDT, such as measurements discussed above, may be performed separately per QoS Class Identifier (QCI). QCI defines a Quality of Service (QoS) level for a radio bearer so that the radio bearers with the same QCI would be treated in a similar way regardless of manufacturers/operators.

Meanwhile, for an UL PDCP queuing delay measurement, there is an agreement that the UL PDCP queuing delay measurement should be performed per QCI per UE and should reflect a packet delay observed at UE's PDCP layer only (from packet arrival at PDCP upper SAP until the packet starts to be delivered to a RLC entity). The remaining issue is how to report the UL PDCP queuing delay measurement to an eNB.

Result of the UL PDCP queuing delay measurement would be obtained in absolute time duration (e.g., the absolute time duration may have unit of milliseconds). However, reporting the measurement result in absolute time duration would cause signaling overhead because absolute time duration might require many bits to represent the value. The signaling overhead can be reduced by defining delay level by ranging of UL PDCP queuing delay values. Thus, a new reporting parameter (i.e., a ratio of an average UL PDCP queuing delay and a PDCP SDU discard timer value, as described in detail below) should be introduced to minimize signaling bits.

In the present invention, in order to minimize signaling overhead regarding an UL PDCP queuing delay measurement report, it is invented that a UE reports an average UL PDCP queuing delay as a ratio of a PDCP SDU discard timer value. A method of reporting a queuing delay measurement performed per QCI will be introduced with reference to FIGS. 9 and 10, and a method of reporting a queuing delay measurement performed per RB will be introduced with reference to FIG. 11.

FIG. 9 is conceptual diagram for a UE operation for reporting a queuing delay measurement for a QCI according to an exemplary embodiment of the present invention.

In descriptions with reference to FIG. 9, it is assumed that a queuing delay measurement is performed per QCI.

A UE may be configured with one or multiple radio bearers (RBs) associated with corresponding QCI value, and the UE is configured with one or multiple discardTimers associated with the one or multiple RBs. Each radio bearer has its own QCI and PDCP SDU discard timer value. That is, each radio bearer associated with the same QCI value can have different PDCP SDU discard timer values.

The UE may receive configuration messages from an eNB. The configuration messages may include: i) PDCP SDU discard timer value per radio bearer (hereinafter, discardTimer), ii) MDT measurement period, and iii) delay threshold ratio per QCI (hereinafter, delayTH_ratio).

The discardTimer may have unit of ms. and the discardTimer indicates time duration between a time point when the discardTimer starts when a PDCP SDU is received from upper layer and a time point when the UE discards the PDCP SDU along with the corresponding PDCP PDU when the PDCP SDU discard timer expires.

The MDT measurement period may have in unit of ms or subframes. The MDT measurement period indicates a time interval of measuring PDCP queuing delay of PDCP SDUs.

The delayTH_ratio may have unit of percentage. One delayTH_ratio is associated with a specific QCI. The delayTH_ratio is a ratio of PDCP queuing delay threshold (hereinafter, delayTH) to a specific discardTimer. The specific discardTimer is the longest discardTimer among the discardTimers for the RBs having same QCI.

When the UE receives configuring messages including delayTH_ratio, the UE calculates delayTH for each QCI. The delayTH for each QCI is calculated as follows: i) If all radio bearers of the same QCI have the same discardTimer, the UE selects the discardTimer when calculating delayTH for the radio bearers having that QCI. ii) If each radio bearer of the same QCI has the different discardTimer, the UE selects the longest discardTimer among the discardTimers for the radio bearers having that QCI when calculating delayTH for the radio bearers having that QCI. iii) The UE multiplies the delyTH_ratio of the corresponding QCI by the selected discardTimer. That is, delayTH=delayTH_ratio x selected discardTimer. iv) The UE uses the calculated delayTH for all radio bearers having that QCI.

The UE measures PDCP queuing delay for each PDCP SDU by measuring a time duration between a time point when a PDCP SDU arrives at PDCP upper SAP and a time point when the PDCP SDU is delivered to a lower layer (e.g., a RLC entity) for each PDCP SDU during MDT measurement period.

After measuring, the UE obtains an average PDCP queuing delay per QCI.

If delayTH_ratio is configured, the average PDCP queuing delay per QCI is obtained as follows: the UE sums up the PDCP queuing delays of PDCP SDUs of radio bearers with same QCI whose PDCP queuing delay is above delayTH, and obtains the average PDCP queuing delay of the corresponding QCI by dividing the summing result by the number of PDCP SDUs of radio bearers with same QCI whose PDCP queuing delay is above delayTH.

If the delayTH_ratio is not configured, the average PDCP queuing delay per QCI is obtained as follows: the UE considers the delayTH as 0, and the UE sums up PDCP queuing delay of all the PDCP SDUs of radio bearers with same QCI, and obtains the average PDCP queuing delay of the corresponding QCI by dividing summing result by the number of PDCP SDUs of radio bearers with same QCI.

The UE reports the average PDCP queuing delay per QCI to the eNB when: i) At the end of MDT measurement period, ii) PDCP queuing delay of a PDCP SDU from radio bearers of same QCI is above delayTH, or iii) Average PDCP queuing delay of all PDCP SDUs from radio bearers of same QCI is above delayTH.

The UE calculates the PDCP queuing delay ratio for each QCI as follows: For a QCI, the UE divides the average PDCP queuing delay by the discardTimer associated with the QCI. That is, PDCP queuing delay ratio=average PDCP queuing delay/discardTimer. Here, if all radio bearers of the same QCI have the same discardTimer, the UE selects the discardTimer. Or, if each radio bearer of the same QCI has the different discardTimer, the UE selects the longest discardTimer among the discardTimers for the radio bearers having that QCI.

When the UE reports Measurement Report to the eNB, the Measurement Report may include QCI value and the PDCP queuing delay ratio of the corresponding QCI value. Preferably, the Measurement Report may include multiple QCI values and the corresponding average PDCP queuing delay ratios. The Measurement Report can be transmitted by RRC/PDCP/RLC/MAC/PHY signaling.

When the eNB receives a Measurement Report including QCI value and PDCP queuing delay ratio of the QCI, the eNB can deduce a PDCP queuing delay of the QCI by multiplying the received PDCP queuing delay ratio by the discardTimer (i.e., the longest discardTimer among the discardTimers for the radio bearers having that QCI).

Referring to FIG. 9, a UE receives a queuing delay measurement configuration including discard timer values and a measurement period from an eNB (S901). Each of the discard timer values respectively corresponds to one radio bearer among a set of radio bearers associated with a QCI configured for the UE.

In some embodiments, the UE may further receive a delay threshold ratio for the QCI from the eNB. In this case, the UE calculates a delay threshold for the QCI by multiplying the delay threshold ratio and the specific discard timer value.

The UE determines a queuing delay for the QCI based on queuing delays for PDCP SDUs from the set of radio bearers during the measurement period (S903). If the delay threshold ratio is configured for the QCI, the queuing delay for the QCI is determined by averaging queuing delays for PDCP SDUs, whose queuing delay is above the delay threshold, from the set of radio bearers during the measurement period. Or, if the delay threshold ratio is not configured for the QCI, the queuing delay for the QCI is determined by averaging queuing delays for all of PDCP SDUs from the set of radio bearers during the measurement period.

The UE selects a specific discard timer value among the discard timer values (S905). If all of the set of radio bearers is associated with a same discard timer value, the specific discard timer value corresponds to the same discard timer value. Or, if at least two radio bearer among the set of radio bearers are associated with different discard timer values, the specific discard timer value is selected as a discard timer value having a largest value among the different discard timer values.

The UE calculates a queuing delay ratio for the QCI by dividing the queuing delay for the QCI by the specific discard timer value (S907), and transmits a queuing delay measurement report including the QCI and the queuing delay ratio for the QCI to the eNB (S909).

In some embodiments, the queuing delay measurement report is transmitted to the eNB, if queuing delay for at least one of PDCP SDUs from the set of radio bearers is above the delay threshold during the measurement period, or if an average of queuing delays for all of PDCP SDUs from the set of radio bearers is above the delay threshold during the measurement period. Or, the queuing delay measurement report is transmitted to the eNB at end of the measurement period.

Meanwhile, the queuing delay measurement report can include multiple QCI values and corresponding multiple queuing delay ratios. In this case, the UE may determine a queuing delay for another QCI based on queuing delays for PDCP SDUs from another set of radio bearers associated with the another QCI during the measurement period, and calculate a queuing delay ratio for the another QCI by dividing the queuing delay for the another QCI by another specific discard timer value among the discard timer values. That is, the queuing delay measurement report further includes the another QCI and the queuing delay ratio for the another QCI.

FIG. 10 shows an example of reporting a queuing delay measurement for a QCI according to an exemplary embodiment of the present invention.

In FIG. 10, an example that a UE reports an average PDCP queuing delay as a ratio of PDCP SDU discard timer value will be described. In the present exemplary embodiment, it is assumed that the UE is configured with 3 radio bearers. Identifiers of radio bearers and QCI of corresponding radio bearer are assumed as described in Table 7 below.

TABLE 7

| RB | QCI associated with each RB |
|---|---|
| RB 1 | QCI 1 |
| RB 2 | QCI 1 |
| RB 3 | QCI 2 |

The UE receives configuration message from an eNB. Information included in the configuration message is described in Table 8 below.

TABLE 8 discardTimer 1 = 50 ms
discardTimer 2 = 30 ms
discardTimer 3 = 20 ms
MDT measurement period = 100 ms
delayTH_ratio 1 = 60%
delayTH_ratio 2 = 80%

In Table 8, discardTimer 1 is PDCP SDU discard timer value for Radio bearer 1, discardTimer 2 is PDCP SDU discard timer value for Radio bearer 2, and discardTimer 3 is PDCP SDU discard timer value for Radio bearer 3. In Table 8, delayTH_ratio 1 is ratio of a PDCP queuing delay threshold for QCI 1, and delayTH_ratio 2 is ratio of a PDCP queuing delay threshold for QCI 2.

After receiving the configuration message, the UE may calculate PDCP queuing delay thresholds (delayTHs) for each QCI.

Regarding QCI 1, when the UE calculates delayTH for QCI 1 (i.e. delay_TH 1), the UE selects the discardTimer 1 between discardTimer 1 and discardTimer 2 for radio bearers having QCI 1 because the discardTimer 1 has longer PDCP SDU discard timer value than discardTimer 2. Then, the UE obtains the delayTH 1 by multiplying the delyTH_ratio 1 by the discardTimer 1. In this case, the delayTH 1 is 30 ms (i.e., delayTH_ratio 1×discardTimer 1=0.60×50 ms=30 ms).

Regarding QCI 2, when the UE calculates delayTH for QCI 2 (i.e. delay_TH 2), the UE selects the discardTimer 3 for radio bearer having QCI 2. Then, the UE obtains the delay TH 2 by multiplying the delayTH_ratio 2 by the discardTimer 3. In this case, the delayTH 2 is 16 ms (i.e., delayTH_ratio 2×discardTimer 3=0.8×20 ms=16 ms).

The UE measures PDCP queuing delays for each PDCP SDU by measuring time duration between a time point when a PDCP SDU arrives at PDCP upper SAP and a time point when the PDCP SDU is delivered to a lower layer (e.g., a RLC entity) for each PDCP SDU during MDT measurement period.

Then, the UE sums up the PDCP queuing delay of PDCP SDUs whose PDCP queuing delay is above delayTH from each RB, and obtains the average PDCP queuing delay of PDCP SDUs whose PDCP queuing delay is above delayTH for each RB by dividing the summing result by the number of PDCP SDUs whose PDCP queuing delay is above delayTH for each RB. Table 9 shows an example of total number of PDCP SDUs for each RB, number of PDCP SDUs whose PDCP queuing delay that is above delayTH for each RB (N_RB ID) and the average PDCP queuing delay of PDCP SDUs whose PDCP queuing delay is above delayTH for each RB (delay_RB ID).

TABLE 9

| Radio bearer ID (RB ID) | Total number of PDCP SDUs for each radio bearer | Number of PDCP SDUs whose PDCP queuing delay are above delayTH for each radio bearer (N_RB ID) | The average PDCP queuing delay of PDCP SDUs whose PDCP queuing delay is above delayTH for each radio bearer (delay_RB ID) |
|---|---|---|---|
| RB 1 | 220 | 200 | 35 ms |
| RB 2 | 350 | 300 | 50 ms |
| RB 3 | 300 | 200 | 18 ms |

Then, the UE may obtain average PDCP queuing delays of each QCI.

Regarding QCI 1, the UE sums up the PDCP queuing delay of PDCP SDUs, whose PDCP queuing delay is above delayTH, from RB 1 and RB 2 with QCI 1. Then, the UE obtains an average PDCP queuing delay of the QCI 1 by dividing the summing result by the number of PDCP SDUs whose PDCP queuing delay are above delayTH from RB 1 and RB 2. The average PDCP queuing delay of the QCI 1 is obtained as 44 ms (i.e., (delay_RB 1×N_RB 1+delay_RB 2×N_RB 2)/(N_RB 1+N_RB 2)=(35×200+50×300)/(200+300)=44 ms).

Regarding QCI 2, the UE sums up the PDCP queuing delay of PDCP SDUs, whose PDCP queuing delay is above delayTH, from RB 3 with QCI 2. Then, the UE obtains the average PDCP queuing delay of the QCI 2 by dividing the result by the number of PDCP SDUs whose PDCP queuing delay are above delayTH from RB 3. The average PDCP queuing delay of QCI 2 is obtained as 18 ms (i.e., (delay_RB 3×N_RB 3)/(N_RB 3)=(18×200)/200=18 ms).

The average PDCP queuing delays of the each QCI is above corresponding delayTH. So, at the end of MDT measurement period, the UE reports Measurement Report by RRC signal, as shown in FIG. 10. That is, the Measurement Report includes: i) QCI 1, ii) an average PDCP queuing delay of QCI 1 as ratio of discardTimer 1 (i.e., Queuing delay ratio of QCI 1 is 88% (44 ms/50 ms×100=88%)), iii) QCI 2, and iv) an average PDCP queuing delay of QCI 2 as ratio of discardTimer 3 (i.e., Queuing delay ratio of QCI 2 is 90% (18 ms/20 ms×100=90%)).

Figure 11:
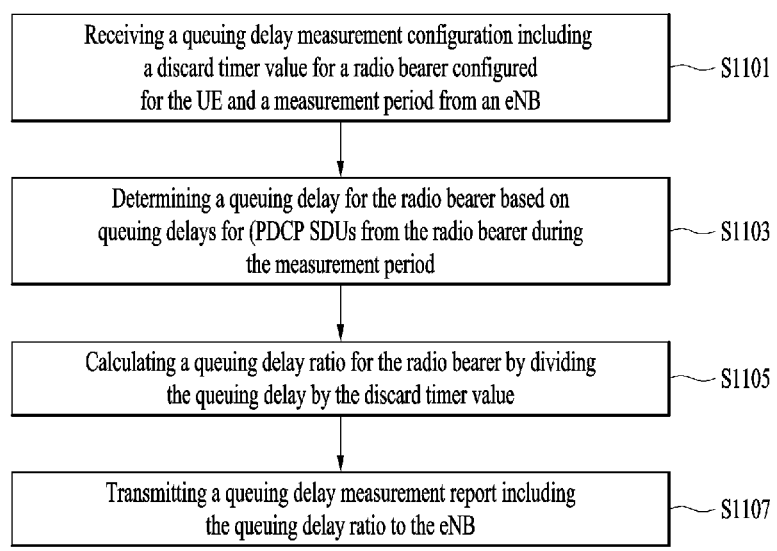
FIG. 11 is conceptual diagram for a UE operation for reporting a queuing delay measurement for a RB according to an exemplary embodiment of the present invention.

FIG. 11 is conceptual diagram for a UE operation for reporting a queuing delay measurement for a RB according to an exemplary embodiment of the present invention.

In descriptions with reference to FIG. 11, it is assumed that a queuing delay measurement is performed per radio bearer (RB).

A UE may be configured with one or multiple RBs, and the UE is configured with one or multiple discardTimers associated with the one or multiple RBs. Each radio bearer has its own PDCP SDU discard timer value. That is, each radio bearer can have different PDCP SDU discard timer values.

The UE may receive configuration messages from an eNB. The configuration messages may include: i) PDCP SDU discard timer value per radio bearer (hereinafter, discardTimer), ii) MDT measurement period, and iii) delay threshold ratio per RB (hereinafter, delayTH_ratio).

The discardTimer may have unit of ms. and the discardTimer indicates time duration between a time point when the discardTimer starts when a PDCP SDU is received from upper layer and a time point when the UE discards the PDCP SDU along with the corresponding PDCP PDU when the PDCP SDU discard timer expires.

The MDT measurement period may have in unit of ms or subframes. The MDT measurement period indicates a time interval of measuring PDCP queuing delay of PDCP SDUs.

The delayTH_ratio may have unit of percentage. One delayTH_ratio is associated with a specific RB. The delayTH_ratio is a ratio of PDCP queuing delay threshold (hereinafter, delayTH) to a discardTimer.

When the UE receives configuring messages including delayTH_ratio, the UE calculates delayTH for each RB. The delayTH for each RB is calculated as follows: The UE multiplies a delyTH_ratio of the corresponding RB by a discardTimer of the corresponding RB.

The UE measures PDCP queuing delay for each PDCP SDU by measuring time duration between a time point when a PDCP SDU arrives at PDCP upper SAP and a time point when the PDCP SDU is delivered to a lower layer (e.g., a RLC entity) for each PDCP SDU during MDT measurement period.

After measuring, the UE obtains an average PDCP queuing delay per RB.

If delayTH_ratio is configured, the average PDCP queuing delay per RB is obtained as follows: the UE sums up the PDCP queuing delays of PDCP SDUs of a RB whose PDCP queuing delay is above delayTH, and obtains the average PDCP queuing delay of the RB by dividing the summing result by the number of PDCP SDUs of the RB whose PDCP queuing delay is above delayTH.

If the delayTH_ratio is not configured, the average PDCP queuing delay per RB is obtained as follows: the UE considers the delayTH as 0, and the UE sums up PDCP queuing delay of all the PDCP SDUs of a RB, and obtains the average PDCP queuing delay of the RB by dividing summing result by the number of PDCP SDUs of the RB.

The UE reports the average PDCP queuing delay per RB to the eNB when: i) At the end of MDT measurement period, ii) PDCP queuing delay of a PDCP SDU from a RB is above delayTH, or iii) Average PDCP queuing delay of all PDCP SDUs from the RB is above delayTH.

The UE calculates the PDCP queuing delay ratio for each RB as follows: For a RB, the UE divides the average PDCP queuing delay by the discardTimer associated with the RB. That is, PDCP queuing delay ratio=average PDCP queuing delay/discardTimer.

When the UE reports Measurement Report to the eNB, the Measurement Report may include the PDCP queuing delay ratio(s) of RB(s). Preferably, the Measurement Report may include multiple average PDCP queuing delay ratios of RBs. The Measurement Report can be transmitted by RRC/PDCP/RLC/MAC/PHY signaling.

When the eNB receives a Measurement Report including a PDCP queuing delay ratio of a RB, the eNB can deduce a PDCP queuing delay of the RB by multiplying the received PDCP queuing delay ratio of the RB by the discardTimer of the RB.

Referring to FIG. 11, the UE receives a queuing delay measurement configuration including a discard timer value for a RB configured for the UE and a measurement period from an eNB (S1101).

In some embodiments, the UE may further receive a delay threshold ratio for the RB from the eNB. In this case, the UE calculates a delay threshold for the RB by multiplying the delay threshold ratio and the discard timer value.

The UE determines a queuing delay for the RB based on queuing delays for PDCP SDUs from the RB during the measurement period (S1103). If the delay threshold ratio is configured, the queuing delay for the RB is determined by averaging queuing delays for PDCP SDUs, whose queuing delay is above the delay threshold, from the RB during the measurement period. Or, if a delay threshold ratio is not configured, the queuing delay for the RB is determined by averaging queuing delays for all of PDCP SDUs from the RB during the measurement period.

The UE calculates a queuing delay ratio for the RB by dividing the queuing delay by the discard timer value (S1105), and transmits a queuing delay measurement report including the queuing delay ratio to the eNB (S1107).

In summary, according to the present invention, it is possible to reduce signaling overhead regarding a queuing delay measurement report, by reporting a queuing delay as a ratio of a discard timer value rather than reporting absolute value of the queuing delay.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
    receiving, from an eNode-B (eNB), a queuing delay measurement configuration including a delay threshold ratio for a Quality of service Class Identifier (QCI) configured for the UE, discard timer values and a measurement period, wherein each of the discard timer values respectively corresponds to one radio bearer among a set of radio bearers associated with the QCI;
    determining a queuing delay for the QCI based on queuing delays for packet data convergence protocol service data units (PDCP SDUs) from the set of radio bearers during the measurement period;
    selecting a specific discard timer value among the discard timer values;
    calculating a delay threshold for the QCI by multiplying the delay threshold ratio and the specific discard timer value and calculating a queuing delay ratio for the QCI by dividing the queuing delay for the QCI by the specific discard timer value; and
    transmitting a queuing delay measurement report including the QCI and the queuing delay ratio for the QCI to the eNB based on the delay threshold.

2. The method according to claim 1,
    wherein if all of the set of radio bearers is associated with a same discard timer value, the specific discard timer value corresponds to the same discard timer value.

3. The method according to claim 1,
    wherein if at least two radio bearer among the set of radio bearers are associated with different discard timer values, the specific discard timer value is selected as a discard timer value having a largest value among the different discard timer values.

4. The method according to claim 1,
    wherein the queuing delay for the QCI is determined by averaging queuing delays for at least part of the PDCP SDUs from the set of radio bearers during the measurement period.

5. The method according to claim 4,
    wherein the at least part of the PDCP SDUs correspond to PDCP SDUs whose queuing delay is above the delay threshold.

6. The method according to claim 1,
    wherein the queuing delay measurement report is transmitted to the eNB, if queuing delay for at least one of the PDCP SDUs from the set of radio bearers is above the delay threshold during the measurement period, or if an average of queuing delays for all of the PDCP SDUs from the set of radio bearers is above the delay threshold during the measurement period.

7. The method according to claim 1,
    wherein the queuing delay measurement report is transmitted to the eNB at end of the measurement period.

8. The method according to claim 1, further comprising:
    determining a queuing delay for another QCI based on queuing delays for PDCP SDUs from another set of radio bearers associated with the another QCI during the measurement period; and
    calculating a queuing delay ratio for the another QCI by dividing the queuing delay for the another QCI by another specific discard timer value among the discard timer values,
    wherein the queuing delay measurement report further includes the another QCI and the queuing delay ratio for the another QCI.

9. A User Equipment (UE) for operating in a wireless communication system, the UE comprising:
    a Radio Frequency (RF) module; and
    a processor operably coupled with the RF module and configured to:
    receive, from an eNode-B (eNB), a queuing delay measurement configuration including a delay threshold ratio for a Quality of service Class Identifier (QCI) configured for the UE, discard timer values and a measurement period, wherein each of the discard timer values respectively corresponds to one radio bearer among a set of radio bearers associated with the QCI,
    determine a queuing delay for the QCI based on queuing delays for packet data convergence protocol service data units (PDCP SDUs) from the set of radio bearers during the measurement period,
    select a specific discard timer value among the discard timer values,
    calculate a delay threshold for the QCI by multiplying the delay threshold ratio and the specific discard timer value and calculate a queuing delay ratio for the QCI by dividing the queuing delay for the QCI by the specific discard timer value, and
    transmit a queuing delay measurement report including the QCI and the queuing delay ratio for the QCI to the eNB based on the delay threshold.

10. The UE according to claim 9,
    wherein if all of the set of radio bearers is associated with a same discard timer value, the specific discard timer value corresponds to the same discard timer value.

11. The UE according to claim 9,
wherein if at least two radio bearer among the set of radio bearers are associated with different discard timer values, the specific discard timer value is selected as a discard timer value having a largest value among the different discard timer values.

12. The UE according to claim 9,
wherein the queuing delay for the QCI is determined by averaging queuing delays for at least part of the PDCP SDUs from the set of radio bearers during the measurement period.

13. The method according to claim 12,
wherein the at least part of the PDCP SDUs correspond to PDCP SDUs whose queuing delay is above the delay threshold.

14. The UE according to claim 9,
wherein the queuing delay measurement report is transmitted to the eNB, if queuing delay for at least one of the PDCP SDUs from the set of radio bearers is above the delay threshold during the measurement period, or if an average of queuing delays for all of the PDCP SDUs from the set of radio bearers is above the delay threshold during the measurement period.

15. The UE according to claim 9,
wherein the queuing delay measurement report is transmitted to the eNB at end of the measurement period.

16. The UE according to claim 9, wherein the processor is further configured to:
determine a queuing delay for another QCI based on queuing delays for PDCP SDUs from another set of radio bearers associated with the another QCI during the measurement period, and
calculate a queuing delay ratio for the another QCI by dividing the queuing delay for the another QCI by another specific discard timer value among the discard timer values,
wherein the queuing delay measurement report further includes the another QCI and the queuing delay ratio for the another QCI.

* * * * *